(12) United States Patent
Kelz

(10) Patent No.: US 7,522,534 B2
(45) Date of Patent: Apr. 21, 2009

(54) METHOD FOR ADAPTING WAP-BASED TRANSMISSIONS

(75) Inventor: Thomas Kelz, Germendorf (DE)

(73) Assignee: FG Microtec GmbH, Munich (DE)

( * ) Notice: Subject to any disclaimer, the term of this patent is extended or adjusted under 35 U.S.C. 154(b) by 407 days.

(21) Appl. No.: 10/523,841

(22) PCT Filed: Aug. 8, 2003

(86) PCT No.: PCT/EP03/08840
§ 371 (c)(1),
(2), (4) Date: Jul. 29, 2005

(87) PCT Pub. No.: WO2004/021649
PCT Pub. Date: Mar. 11, 2004

(65) Prior Publication Data
US 2006/0165006 A1 Jul. 27, 2006

(30) Foreign Application Priority Data
Aug. 8, 2002 (DE) ............................... 102 36 567
Jan. 8, 2003 (DE) ............................... 103 00 495

(51) Int. Cl.
*H04J 1/16* (2006.01)
*H04J 3/16* (2006.01)
(52) U.S. Cl. ................. 370/252; 370/338; 370/465
(58) Field of Classification Search ............... 370/252, 370/465, 338
See application file for complete search history.

(56) References Cited

U.S. PATENT DOCUMENTS

| 2002/0025806 A1* | 2/2002 | Gerber | 455/422 |
| 2002/0164983 A1* | 11/2002 | Raviv et al. | 455/432 |
| 2003/0157942 A1* | 8/2003 | Osmo | 455/456 |
| 2003/0220835 A1* | 11/2003 | Barnes, Jr. | 705/14 |
| 2007/0173266 A1* | 7/2007 | Barnes, Jr. | 455/456.1 |

FOREIGN PATENT DOCUMENTS

GB 2 351 874 A 1/2001

OTHER PUBLICATIONS

International Search Report.
Martinez J et al: "Virtual Path Long-Term Bandwidth Allocation Algorithm for ATM Networks Using Simulated Annealing", Electronics Letters, Mar. 19, 1998, vol. 34, No. 6.
"Wireless Application Protocol Architecture Specification", WAP Architecture, Version 30, Apr. 1998, pp. 1-20.

* cited by examiner

*Primary Examiner*—Andrew Lee
(74) *Attorney, Agent, or Firm*—Buchanan Ingersoll & Rooney PC

(57) ABSTRACT

The invention relates to a method which makes decisions, which can be applied an various WAP protocol, based on calculations which determine the future quality of a link. Short-term forecasting involving fundamental decisions such as the structure of a link or the transmission or reception of data occurs. Short-term forecasting is used to modify certain parameters which are linked to the transmission of packets.

11 Claims, 2 Drawing Sheets

| Parameter | Layer | Direction | Time effect | Influence on | Influence by the FFC |
|---|---|---|---|---|---|
| Send/ Get | WSP | UL/DL | Long | Start Point of data transfer | direct |
| Resume/ Suspend | WSP | UL/DL | Long | Suspend connection/ resume a suspended connection | direct |
| Transaction Class | WTP | UL/DL | Long | Transaction mode | Not necessary |
| (selective) retransmission until acknowledgment | WTP | UL/DL | Short | Reliability, used gross bandwidth | Indirect |
| Selective Acknowledgment | WTP | UL/DL | Short | Retransmission out of the row, reducing wasted bandwidth caused by unnecessary retransmitted packets | Indirect |
| Asynchronous transaction | WTP | UL | Short | Number of transactions at the same time | Direct |
| HOLD | WTP | UL/DL | Short | Delaying retransmission | Direct |
| Sliding transaction window (packet groups) | WTP | UL | Short | Optimizing transmission, burst mode | Direct |
| Segmentation and Concatenation | WTP | UL | Short | Optimisation of packet length | Direct |
| Send-no send | WDP or IP | UL | Short | Find optimal time to send | Direct |

| Parameter | Layer | Direction | Time effect | Influence on | Influence by the PFC |
|---|---|---|---|---|---|
| Send/ Get | WSP | UL/DL | Long | Start Point of data transfer | direct |
| Resume/ Suspend | WSP | UL/DL | Long | Suspend connection/ resume a suspended connection | direct |
| Transaction Class | WTP | UL/DL | Long | Transaction mode | Not necessary |
| (selective) retransmission until acknowledgment | WTP | UL/DL | Short | Reliability, used gross bandwidth | Indirect |
| Selective Acknowledgment | WTP | UL/DL | Short | Retransmission out of the row, reducing wasted bandwidth caused by unnecessary retransmitted packets | Indirect |
| Asynchronous transaction | WTP | UL | Short | Number of transactions at the same time | Direct |
| HOLD | WTP | UL/DL | Short | Delaying retransmission | Direct |
| Sliding transaction window (packet groups) | WTP | UL | Short | Optimizing transmission, burst mode | Direct |
| Segmentation and Concatenation | WTP | UL | Short | Optimization of packet length | Direct |
| Send-no send | WDP or IP | UL | Short | Find optimal time to send | Direct |

FIG. 3

METHOD FOR ADAPTING WAP-BASED TRANSMISSIONS

This disclosure is based upon German Application Nos. 102 36 567.9 and 103 00 495.5, filed Aug. 8, 2002, and Jan. 8, 2003, and International Application No. PCT/EP2003/008840, filed Aug. 8, 2003, the contents of which are incorporated herein by reference.

The invention relates to a method for adapting WAP-based transmissions. In particular, the invention relates to the control of the flow of data in WAP-based methods. In this context, the quality and flow are predicted so as then to optimize the information interchange through parameterization.

1. Field of the Invention

WAP is a protocol stack which is optimized for mobile communication. This stack is used in most GSM or GPRS applications of mobile terminals today; there is also future provision for the stack to be used for UMTS applications, and application in other environments would also be conceivable. This is true at least for Europe. WAP is not just a protocol, but rather comprises all layers, from the application layer through to layer 2. The WAP stack thus has five layers, with all protocols having been specified by a forum. The protocol is designed specifically for transmitting data between mobile terminals and the mobile network. There are thus different standards, WAP 1.0 and WAP 2.0. It is now possible to use IETF protocols for transmission and for session control. A WAP connection exists between a client and a gateway, which is connected to other services such as the Internet but also to other services.

Hence, there is WAE (Wireless Application Environment), which allows interactions between WAP/WEB applications and wireless appliances which comprise a WAP browser.

There is also the WSP (Wireless Session Protocol), which implements a functionality similar to HTTP and provides new features, such as a very lengthy session, and implements suspend and resume functionality. It is also responsible for sending and getting information. Suspend and resume can also be used to maintain a connection or to interrupt it briefly, depending on what the situation requires. This has the advantage that the data which have already been sent do not need to be sent again.

A further protocol is the WTP (Wireless Transaction Protocol). This is a very simple transaction-oriented protocol which can be used for implementing clients (mobile terminals) and which operates efficiently over wireless packet-oriented networks. This protocol is responsible for transaction management, retransmission, the removal of duplicates, control operations, packet connections and disconnections, packet segmentation and reassembly. The functionalities are comparable with TCP. However, it is geared to connections which have higher rates of error. There is thus no TTL (Time To Live). There are different transaction classes, retransmissions for confirmation and selective retransmissions, selective confirmation operations and asynchronous transactions, flexible confirmations (HOLD) and moving transaction windows. These are just a few features of this protocol.

2. Prior Art

[31] discloses a method which determines or predicts the quality of the connection, particularly of the uplink. This method is not tuned specifically to the present protocol, however.

It is an object of the invention to influence and improve the reliable protocol WAP to such an extent that retransmissions are reduced and as a result a higher throughput is achieved. In this context, it is necessary to take account of the quality of the connection and cell change.

This object is achieved by the inventions having the features of the independent claims. Advantageous developments of the inventions are characterized in the subclaims.

Seen abstractly, they involve a method which makes decisions on the basis of calculations which determine the future quality of the connection and also future cell changes and implements them on the different layers of the WAP protocol.

In this context, first of all short-term predictions are made which decide about basic decisions such as design of a connection or transmission and reception of data.

Shorter-term predictions are used to alter a few parameters which are associated with the transmission of packets.

In particular, they involve a method for determining parameters for WAP-based transmissions, where short-term and long-term predictions are taken as a basis for making decisions about the type of transmission. For long-term predictions about the possibility of setting up a connection or the quality of a connection, decisions in the form of send or request data or suspend and resume the connection are made.

For decisions about sending and receiving (SEND and GET), basic decisions are made regarding whether data need to be received or need to be sent. Normally, such a starting point is flexible.

The commands SUSPEND and RESUME suspend a connection or resume it. Corresponding commands are known from the FTP protocol, for example. Should the short-term predictions, for example, predict an enormous degree of impairment and the long-term statements likewise, the connection can be suspended. Should there be an improvement in the short-term and long-term predictions, the connection is restarted.

For short-term predictions regarding an existing connection, a decision in the form of the number of asynchronous transactions or of the delay of a transmission or of a retransmission or alteration in the burst mode or of the adaptation of the packet size is made.

Should the quality fall below a particular value in future, for example, it is possible to delay the transmission of a packet. In particular, it can be delayed when a confirmation for the packet does not need to be sent and has not arrived in an appropriate period of time. Particularly in the case of retransmissions, it is advantageous to determine an interval using a counter. Hence, WAP involves determining an interval using a counter which is counted down. Should a retransmission be necessary, the counter or the interval is increased and counted down again. Depending on the quality, the interval can be increased or reduced. Should a very high quality be predicted, it is advantageous to send packets again more quickly. If there is a shortfall below a particular quality, a longer interval should be chosen.

It is thus possible to alter the number of parallel transactions as a function of the quality of the connection. Although a large number of transactions with small packets increases the overhead of control information over useful data, the error rate per packet decreases. In addition, it may be necessary to increase the number of simultaneous asynchronous transactions for a few applications which run in parallel on the terminal.

When adapting the burst rate, a large number of packets are sent which are confirmed by a message from the receiver. In this context, not every single packet is confirmed, but just one sequence. Should there be packets missing, the number of missing packets is communicated. Should a connection have a high quality, the burst rate can be increased. If packet loss can be ruled out on the basis of the prediction, then the next packet group (the next burst) is transmitted in enforced fashion in order to avoid unnecessary waiting times and to increase the data throughput. Should packet loss be predicted, this response is reset again and the next burst is transmitted in normal mode.

It is also possible to influence the packet size. If there is just one packet then there is a higher probability of errors arising. This probability can thus be increased only if a high level of quality is present or to be expected. In addition, when a cell change is predicted, the packet length is chosen such that the transmission of the packet can be concluded in full in the old cell. The next packet's transaction then involves waiting until the cell change has taken place.

A cell change can be predicted whenever the signal strength in one cell decreases and the signal strengths in other surrounding cells increase. A prediction can therefore be made on the basis of the profile of the signal strengths.

The method for predicting the quality preferably uses a multidimensional stochastic algorithm which, in particular, uses covariance matrices, neural networks, genetic algorithms and/or simulated annealing. In this context, time-dependent statements about the quality or imminent cell change are calculated.

In the case of GSM/GPRS, preferably the received signal code power (RSCP), the position, the direction, the level, the speed, the received signal strength indicator (RSSI), the block size, the codec, the header compression method, SNR, the volume of traffic, the transmission delay, the block error rate, the bit error rate or carrier to interference ratio (C/I), power control commands are included in the calculation, with the outputs being determined therefrom. It is pointed out that these influencing variables cannot claim to be complete. It is likewise conceivable to use control codes to carry out weighting operations which are included in the algorithm. It is also possible to have the quality of the uplinks and downlinks included in a particular ratio. In the case of UMTS, analog variables are used for calculation.

A further part of the present invention is a mobile terminal in the form of a PDA or of a GSM/GPRS/UMTS mobile phone, with means and the setup thereof, which allow the execution of a method as claimed in the method claims. Normally, these apparatuses have one or more microprocessors which are controlled by software. This software implements the process, particularly the method for predicting the quality, on the one hand, and secondly the method which is used to make adaptations on the basis of the predictions. The software does not necessarily need to be implemented just on one microprocessor; it is also possible for it to be logically distributed over a plurality of microprocessors, which may also be located in different appliances (e.g. mobile phone and PDA).

The invention is explained in more detail below using exemplary embodiments which are shown schematically in the figures. Identical reference numerals in the individual figures denote the same elements in this case. Specifically:

FIG. 3 shows a table containing parameters, which may be part of the WAP stack, and their property over the transmission.

Figure 1:
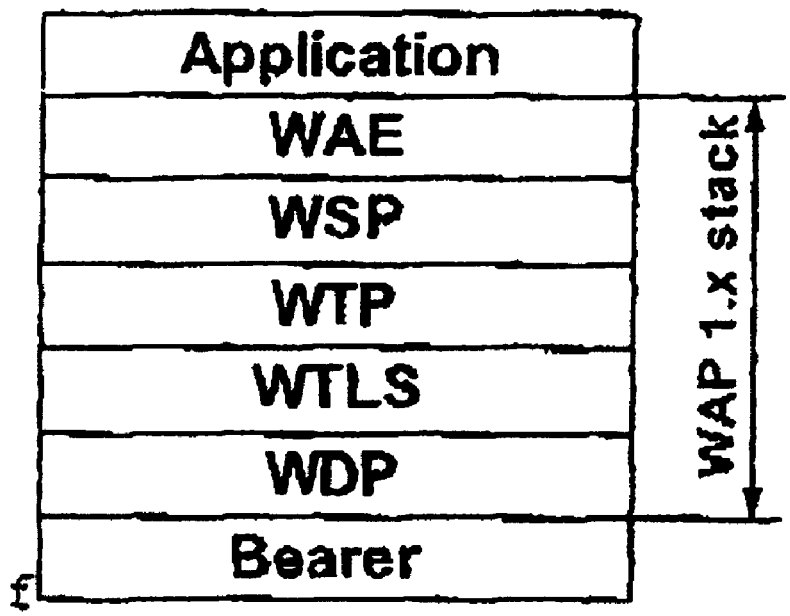
FIG. 1 shows the schematic structure of the WAP stack in version 1.x.
Figure 2:
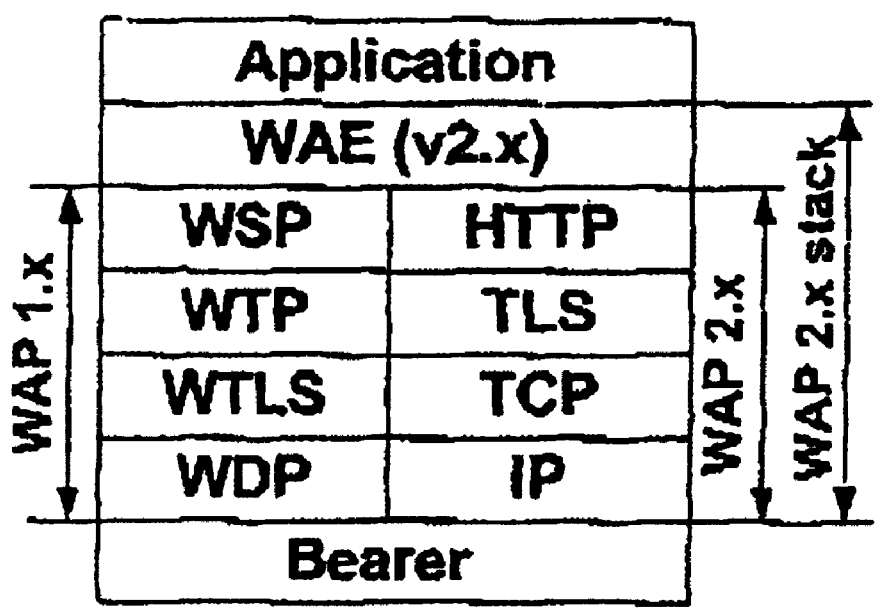
FIG. 2 shows the schematic structure of the WAP stack in version 2.x with an integrated 1.x stack.

The text below describes examples of short/long-term predictions.

In the first example, there is a prediction that the carrier to interference ratio (C/I) will be significantly impaired in the time in which the next packets will probably be transmitted, and will subsequently be at a very low level again. In this case, parameters which are effective in the short term would be used (send packet with a delay, reduce size of packet groups . . . ). In the converse case (all quite well in the short term, with a long-lasting high level of interference subsequently appearing), attempts are made in the short term to transmit as much as possible (large number of transactions, large packet groups) so as then to use long-term parameters in timely fashion (e.g. "suspend" the connection using SUSPEND).

Another example of long/short term is that CIR is known to be good at present, but other information (transmission power close to the maximum permissible power . . . ) can be used to infer that the terminal is at the edge of the cell and hence the quality of the connection will soon become very poor. In this case too, attempts are made to transmit the data quickly.

There follows a packet group/number of asynchronous transmissions example (number of transactions and packet groups):

The number of packets which can be transmitted in optimum fashion at a particular time is constant and known (given by available bandwidth and connection quality). There is now a free choice as to how this number will be split.

Case A: either fewer asynchronous transmits (transmissions) and therefore larger packet groups or Case B: more asynchronous transmits and therefore smaller packet groups If a large message is to be sent or a particular action has higher priorities, then case A is taken into account. This connection requires the largest possible packet group to be formed.

If, by contrast, a plurality of data volumes having equal authority are to be transmitted, then attempts are made to transmit all of them with the same authority in parallel, that is to say case B. The table in FIG. 3 first of all shows the parameters which can be changed by the method by controlling them directly. Other parameters are not changed or controlled indirectly. It is also possible to see which layer of the layer model has the commands associated with it. A further column in the table shows what effect they have and whether they can be influenced directly by the present method. It is thus possible to see from the fifth column what influence they have on the transmission.

LIST OF CITED LITERATURE

[1] 3GPP TS 02.60: "General Packet Radio Service (GPRS); Service description; Stage 1"
[2] 3GPP TS 03.64: "Overall description of the GPRS radio interface; Stage 2"
[3] 3GPP TS 05.01: "Physical layer on the radio path"
[4] 3GPP TS 05.05: "Radio transmission and reception"
[5] 3GPP TS 05.08: "Digital cellular tele-communications system (Phase 2+); Radio subsystem link control"
[7] 3GPP TS 05.10: "Digital cellular tele-communications system (Phase 2+); Radio subsystem synchronization"
[8] Wireless Application Protocol Architecture Specification WAP-210-WAPArch
[9] Wireless Application Protocol WAP-199-WTLS Wireless Transport Layer Security Specification
[10] Wireless Application Protocol WAP-224-WTP
[11] WAP-230-WSP Wireless Application Protocol Wireless Session Protocol Specification
[12] Wireless Application Protocol WAP-236-WAESpec
[13] Wireless Application Protocol WAP-259-WDP
[14] TS 25.331: "RRC Protocol Specification"
[15] TS 25.322: "Radio Link Control (RLC) Protocol Specification"

[16] TS 25.321: "Medium Access Control (MAC) Protocol Specification"
[17] TS 25.215: "Physical layer-Measurements (FDD)"
[18] TS 25.225: "Physical layer-Measurements (TDD)"
[19] TS 25.932: "Access Stratum Delay Budget"
[20] G. Golub, Ch. Van Loan: Matrix Computations, Johns Hopkins University Press, third edition, 1966
[21] EP 1 059 792 A2: "Method and system for wireless QoS agent for All-IP network", Nortel Networks, 13.12.2000
[22] Larimore, W. E.: (2000), "Identification of Colinear and Cointegrated Multivariable Systems Using Canonical Variate Analysis", in Preprints of Symposium on System Identification 2000, held Jun. 21-23, 2000, Santa Barbara, Calif.
[23] Golub, Gene H. and Charles Van Loan, Matrix Computations, Third Edition, Johns Hopkins University Press, Baltimore, 1996
[24] Wallace E. Larimore, Franklin T. Luk, "System Identification and control using SVD's on Systolic Arrays", SPIE Vol. 880 High Speed Computing (1988) QA 76.54 #54, 1988
[25] JP 09219697; U.S. Pat. No. 5,491,837; U.S. Pat. No. 5,710,791; U.S. Pat. No. 5,506,869; U.S. Pat. No. 5,845,208; U.S. Pat. No. 5,878,342; U.S. Pat. No. 5,886,988; U.S. Pat. No. 5,828,658; U.S. Pat. No. 6,101,383; U.S. Pat. No. 6,137,993; U.S. Pat. No. 5,794,155; WO 9610301; WO 9913660; WO 9951052; WO 0004739; WO 0025530; WO 0056103; WO 0033479; WO 9411972; EP 0455614;
[26] "Genetic Algorithms for Control and Signal Processing", K. F. Man, S. Kwong, W. A. Halang, K. S. Tang, ISBN: 3540761012, Springer-Verlag New York,
[27] "Genetic Algorithms in Optimization, Simulation & Modeling", J. Stender, E. Hillebrand, J. Kingdon, ISBN: 9051991800, Press, Incorporated, 1994
[28] Basis for predicting the UMTS FDD uplink quality_v2
[29] "Genetic Algorithms & Simulated Annealing", Lawrence Davis, ISBN: 0273087711, Pitman Publishing, 1987
[30] "Applied Simulated Annealing", Rene V. Vidal, ISBN: 038756229X, Springer-Verlag, 1993
[31] "Simulated Annealing: Theory and Applications", P. J. Van Laarhoven, Emile H. Aarts, ISBN: 9027725136, Kluwer Academic Publishers, 1987

The invention claimed is:

1. A method for controlling a mobile terminal that determines parameters for a WAP-based transmission via a wireless connection, said parameters being determined based on short-term and long-term predictions about the quality of the wireless connection, said method comprising:
   making by the mobile terminal a first determination whether to suspend or resume the transmission based on the long-term predictions; and
   making by the mobile terminal a second determination whether to change one or more of the following parameters based on the short-term predictions: the number of asynchronous transactions, the delay of a retransmission, an alteration in the burst mode, and the packet size; suspending or resuming by the mobile terminal the transmission based on the result of the first determination; and changing by the mobile terminal the parameters based on the result of the second determination.

2. The method as claimed in claim 1, wherein, if the short-term and long-term predictions predict an imminent cell change:
   adapting the packet size to terminate the transmission before the cell change; and
   waiting with the next packet for the cell change to have taken place.

3. The method as claimed claim 1, wherein, if the short-term and long-term predictions rule-out packet loss during the transmission, transmitting a next packet group (burst) is transmitted in enforced fashion in order to ensure continual data transmission and to minimize breaks.

4. The method as claimed in claim 1, wherein, if the short-term and long-term predictions predict a shortfall below a particular quality for the connection, delaying the transmission a packet until the quality rises.

5. The method as claimed in claim 1, wherein, if the short-term and long-term predictions predict a shortfall below a particular quality, reducing the packet size.

6. The method as claimed in claim 1, wherein, if the short-term and long-term predictions predict a shortfall below a particular quality, altering the number of parallel transactions, with the number being increased and the size of the packets being reduced, in particular.

7. The method as claimed in claim 1, wherein, if the short-term and long-term predictions predict an excess over a particular quality, increasing the burst rate.

8. The method as claimed in claim 1, wherein the short-term and long-term predictions are determined by a multidimensional stochastic algorithm, which uses covariance matrices, neural networks, genetic algorithms and/or simulated annealing.

9. The method as claimed in claim 1, wherein an algorithm calculates time-dependent statements about the quality.

10. The method as claimed in claim 1, wherein the short-term and long-term predictions are based on one or more of the following: received signal code power (RSCP), position, direction, level, speed, received signal strength indicator (RSSI), block size, a codec, a header compression method, SNR, volume of traffic, transmission delay, block error rate, bit error rate and/or carrier to interference ratio (C/I).

11. A computer-readable data storage device including program instructions that when executed by a processor, controls a mobile terminal to perform a method for determining parameters for a WAP-based transmission via a wireless connection, said parameters being determined based on short-term and long-term predictions about the quality of the wireless connection,
   said method comprising:
      making a first determination whether to suspend or resume the transmission based on the long-term predictions; and
      making a second determination whether to change one or more of the following parameters based on the short-term predictions: the number of asynchronous transactions, the delay of a retransmission, an alteration in the burst mode, and the packet size.

* * * * *